(12) United States Patent
Lee et al.

(10) Patent No.: US 11,721,885 B2
(45) Date of Patent: Aug. 8, 2023

(54) ELECTRONIC DEVICE

(71) Applicant: SAMSUNG DISPLAY CO.. LTD., Yongin-si (KR)

(72) Inventors: Seongryong Lee, Hwaseong-si (KR); Kiseo Kim, Yongin-si (KR); Jae-Kyoung Kim, Hwaseong-si (KR); Eunjin Sung, Yongin-si (KR); Sangrock Yoon, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 14 days.

(21) Appl. No.: 17/349,676

(22) Filed: Jun. 16, 2021

(65) Prior Publication Data
US 2022/0109227 A1    Apr. 7, 2022

(30) Foreign Application Priority Data

Oct. 5, 2020  (KR) .................. 10-2020-0128296

(51) Int. Cl.
*H01Q 1/24* (2006.01)
*G06F 3/044* (2006.01)
*G06F 1/16* (2006.01)
*G06F 3/041* (2006.01)

(52) U.S. Cl.
CPC .......... *H01Q 1/243* (2013.01); *G06F 1/1643* (2013.01); *G06F 3/0412* (2013.01); *G06F 3/0446* (2019.05)

(58) Field of Classification Search
CPC ..... G06F 1/1643; G06F 3/0446; G06F 1/1698
See application file for complete search history.

(56) References Cited

U.S. PATENT DOCUMENTS

| | | | | |
|---|---|---|---|---|
| 2014/0176819 | A1* | 6/2014 | Yilmaz | G06F 1/1698 349/12 |
| 2015/0255856 | A1* | 9/2015 | Hong | H01Q 21/061 343/702 |
| 2020/0021016 | A1 | 1/2020 | Son et al. | |

FOREIGN PATENT DOCUMENTS

| | | |
|---|---|---|
| EP | 3 553 883 | 9/2018 |
| EP | 3 471 197 | 4/2019 |
| EP | 3 598 572 | 1/2020 |
| KR | 10-2035689 | 10/2019 |
| KR | 10-2020-0008408 | 1/2020 |
| WO | WO 2016/048101 | 3/2016 |

OTHER PUBLICATIONS

Syamimi Mohd Norzeli, et al., "Design of High Gain Microstrip Patch Reader Array Antenna with Parasitic Elements for UHF RFID Application," International Journal of Engineering & Technology, 7 (4.35) (2018), pp. 463-467.

(Continued)

*Primary Examiner* — Robin J Mishler
(74) *Attorney, Agent, or Firm* — F. Chau & Associates, LLC

(57) ABSTRACT

An electronic device includes a display module including a display area and a non-display area. An antenna layer is disposed on the display module, including a bending area at least partially overlapping the non-display area and a non-bending area adjacent to the bending area, and including a first portion disposed in the non-bending area and a second portion disposed in the bending area, and bent, and a spacer disposed between the second portion and the display module and including a metal plate that is bent.

24 Claims, 13 Drawing Sheets

(56) References Cited

OTHER PUBLICATIONS

Mekala Harinath Reddy, et al., "Bandwidth Enhancement of Microstrip Patch Antenna using Parasitic Patch," 2017 IEEE International Conference on Smart Technologies and Management for Computing. Communication, Controls, Energy and Materials (ICSTM), Veltech Dr RR & Dr.SR University, Cbennai, T.N., India. Aug. 2-4, 2017. pp. 295-298.

Wei Chen, et al., "Spectral-Domain Moment-Method Analysis of Coplanar Microstrip Parasitic Subarrays," Microwave and Optical Technology Letters vol. 6, No. 3, Mar. 5, 1993, pp. 157-161.

* cited by examiner

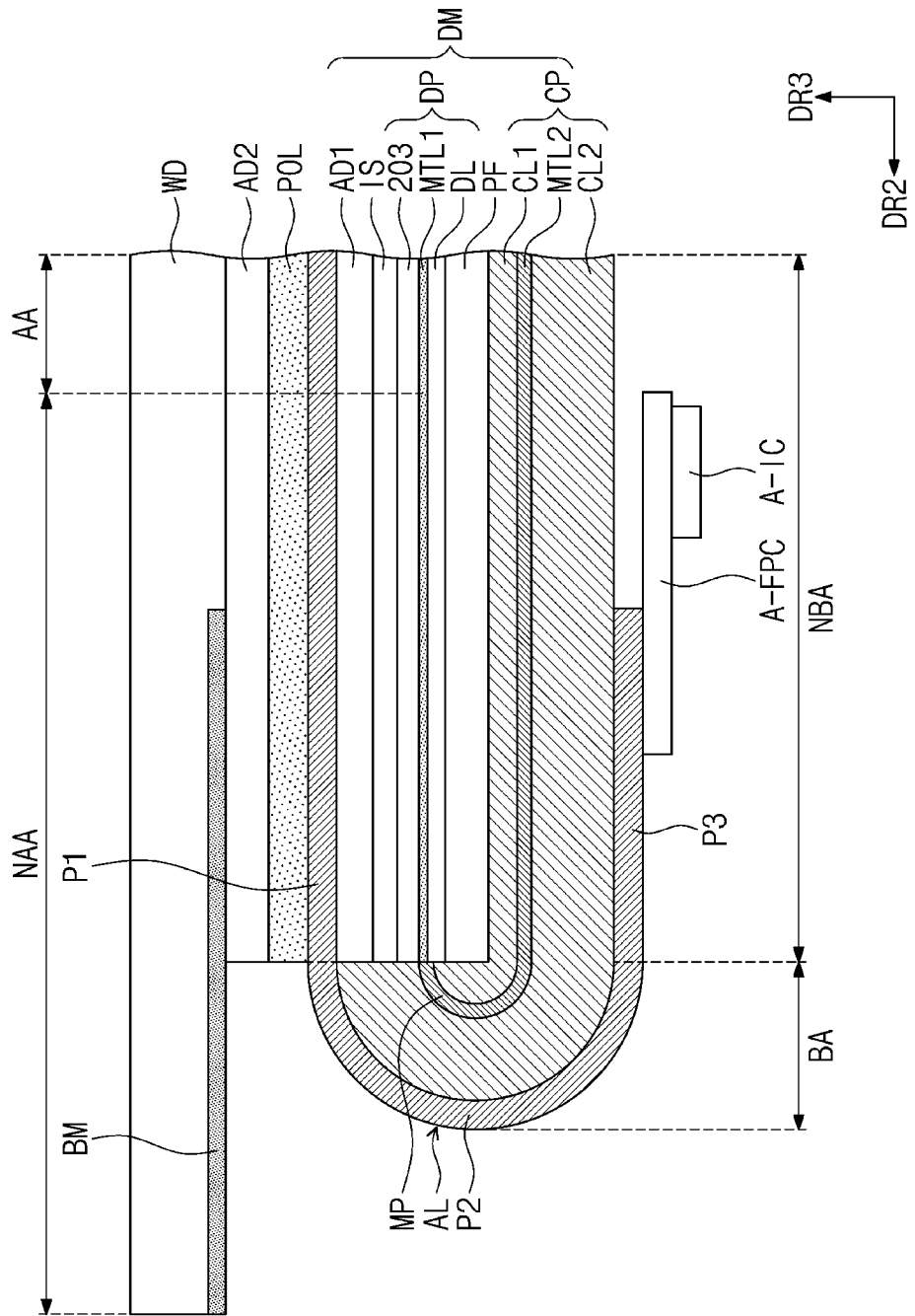

ELECTRONIC DEVICE

CROSS-REFERENCE TO RELATED APPLICATION

This U.S. non-provisional patent application claims priority under 35 U.S.C. § 119 to Korean Patent Application No. 10-2020-0128296, filed on Oct. 5, 2020, the contents of which are hereby incorporated by reference in its entirety.

TECHNICAL FIELD

The present disclosure relates to an electronic device. More particularly, the present disclosure relates to an electronic device including an antenna layer that is bent.

DISCUSSION OF THE RELATED ART

An electronic device includes various electronic modules. For example, where the electronic device is a mobile terminal or a wearable device, the electronic modules may include an antenna module, a camera module, and/or a battery module. As the mobile terminal becomes thin and the wearable device becomes small, a space for the electronic modules gradually decreases. In addition, as the electronic device becomes capable of performing a wide range of different functions, the number of electronic modules included in the electronic device increases.

SUMMARY

An electronic device includes a display module including a display area and a non-display area. An antenna layer is disposed on the display module. The antenna layer includes a bending area at least partially overlapping the non-display area and a non-bending area adjacent to the bending area. The antenna layer further includes a first portion disposed in the non-bending area and a second portion disposed in the bending area. The second portion of the antenna layer is bent. A spacer is disposed between the second portion and the display module and includes a metal plate that is bent.

The spacer may include a first layer adjacent to the second portion, a second layer adjacent to the display module, and a metal plate disposed between the first layer and the second layer.

A curvature of a contact surface of the first layer making contact with the second portion may be substantially the same as a curvature of the second portion.

The metal plate may have a curvature that is substantially the same as a curvature of the second portion.

The display module may include a display panel and an input sensor disposed on the display panel. The antenna layer may be disposed on the input sensor.

The display panel may include an encapsulation layer. The input sensor may be disposed directly on the encapsulation layer.

The display module may further include a protective layer disposed under the display panel to protect the display panel. The protective layer may include at least one metal layer.

The metal plate may extend from the metal layer.

The antenna layer may further include a plurality of antennas, a plurality of antenna lines electrically connected to the plurality of antennas, respectively, and a plurality of antenna pads electrically connected to the plurality of antenna lines, respectively.

The antenna layer may have a thickness that is greater than a thickness of the input sensor.

The plurality of antennas may have a mesh shape.

The antenna layer may further include a third portion disposed on a surface of the display module opposite to a surface on which the first portion is disposed. The second portion may connect the first portion to the third portion.

The plurality of antennas may be disposed on the first portion. The plurality of antenna lines may be disposed on the second portion. The plurality of antenna pads may be disposed on the third portion.

The electronic device may further include an antenna circuit layer disposed on the third portion and electrically connected to the plurality of antenna pads.

The display module may include at least one metal layer.

The second portion of the antenna layer may have a thickness that is smaller than a thickness of the first portion.

An electronic device includes a display module including a display area and a non-display area. An antenna layer is disposed on the display module. The antenna layer includes a bending area at least partially overlapping the non-display area and a non-bending area adjacent to the bending area. The antenna layer further includes a first portion disposed in the non-bending area and a second portion disposed in the bending area, and the second portion is bent. A metal member is disposed between the second portion and the display module. A spacer is disposed between the metal member and the second portion.

The metal member may include a first surface adjacent to the spacer and a second surface adjacent to the display module. The first surface may have a round shape. The first surface may have a curvature that is substantially the same as a curvature of the second portion.

The display module may include a plurality of metal layers spaced apart from each other.

The metal member may have a semi-circular shape in a cross-section. A diameter of the semi-circular shape may be substantially the same as a separation distance between the metal layers.

An electronic device includes a display module including a display area and a non-display area, a window, and an antenna layer disposed between the display module and the window and at least partially overlapping both the display area and the non-display area of the display module. A portion of the antenna layer is bent around the non-display area of the display module such that a portion of the non-display area of the display module is disposed between the antenna layer on two opposite sides thereof.

A spacer may separate a bent portion of the antenna layer from the display module.

An input sensor layer may be disposed between the display area of the display module and the antenna layer.

A display driver may be mounted on a portion of the antenna layer that is bent around the display module.

BRIEF DESCRIPTION OF THE DRAWINGS

The above and other aspects of the present disclosure will become readily apparent by reference to the following detailed description when considered in conjunction with the accompanying drawings, wherein:

FIGS. 10A to 10C are cross-sectional views illustrating an electronic device according to an embodiment of the present disclosure.

DETAILED DESCRIPTION

Figure 1:
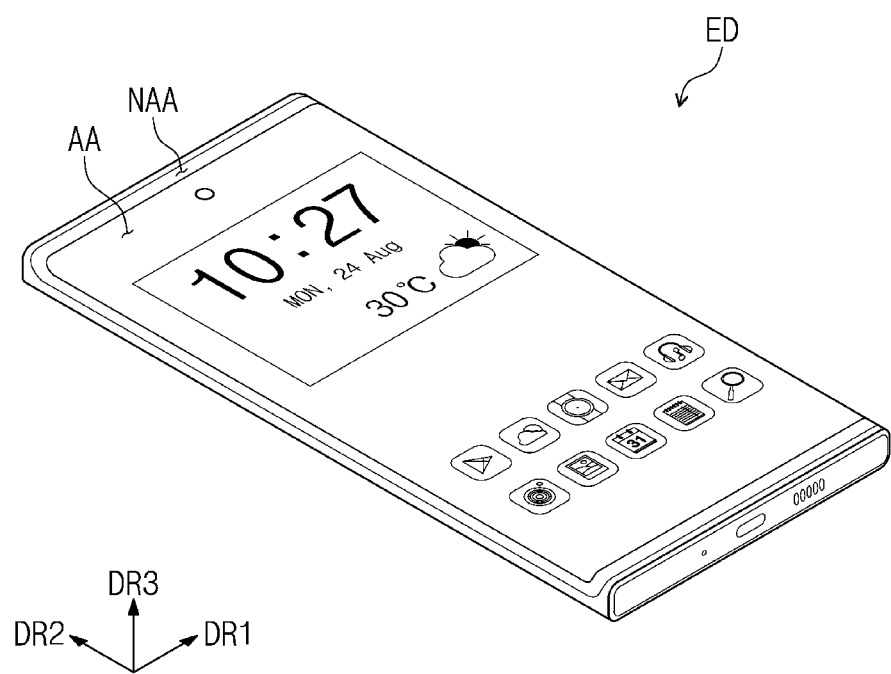
FIG. 1 is a perspective view illustrating an electronic device according to an embodiment of the present disclosure.

In the present disclosure, it will be understood that when an element or layer is referred to as being "on", "connected to" or "coupled to" another element or layer, it can be directly on, connected or coupled to the other element or layer or intervening elements or layers may be present.

Like numerals may refer to like elements throughout the specification and the drawings. In the drawings, the thickness, ratio, and dimension of components may be exaggerated for effective description of the technical content. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not necessarily be limited by these terms. These terms are used to distinguish one element, component, region, layer or section from another region, layer or section. Thus, a first element, component, region, layer or section discussed below could be termed a second element, component, region, layer or section without departing from the teachings of the present disclosure. As used herein, the singular forms, "a", "an" and "the" are intended to include the plural forms as well, unless the context clearly indicates otherwise.

Spatially relative terms, such as "lower", "upper" and the like, may be used herein for ease of description to describe one element or feature's relationship to another element(s) or feature(s) as illustrated in the figures.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, the present disclosure will be explained in detail with reference to the accompanying drawings.

FIG. 1 is a perspective view illustrating an electronic device ED according to an embodiment of the present disclosure.

Referring to FIG. 1, the electronic device ED may be activated in response to electrical signals. For example, the electronic device ED may be a mobile phone, a tablet computer, a vehicle navigation unit, a handheld game console, or a wearable unit, however, the present invention need not be limited thereto or thereby. FIG. 1 shows the mobile phone as a representative example of the electronic device ED. The electronic device ED may be a communication unit.

The electronic device ED may include a display area AA and a non-display area NAA. The non-display area NAA may be a peripheral area at least partially surrounding the display area AA. The electronic device ED may display an image through the display area AA.

A thickness direction of the electronic device ED may be substantially parallel to a third direction DR3 crossing a first direction DR1 and a second direction DR2. Accordingly, front (or upper) and rear (or lower) surfaces of each member of the electronic device ED may be defined with respect to the third direction DR3. The expression "viewed in a plane" may mean a state of being viewed in the third direction DR3. The expression "viewed in a cross-section" may mean that the cross-section of the electronic device ED in the third direction DR3 is viewed in the first direction DR1 or the second direction DR2.

Figure 2:
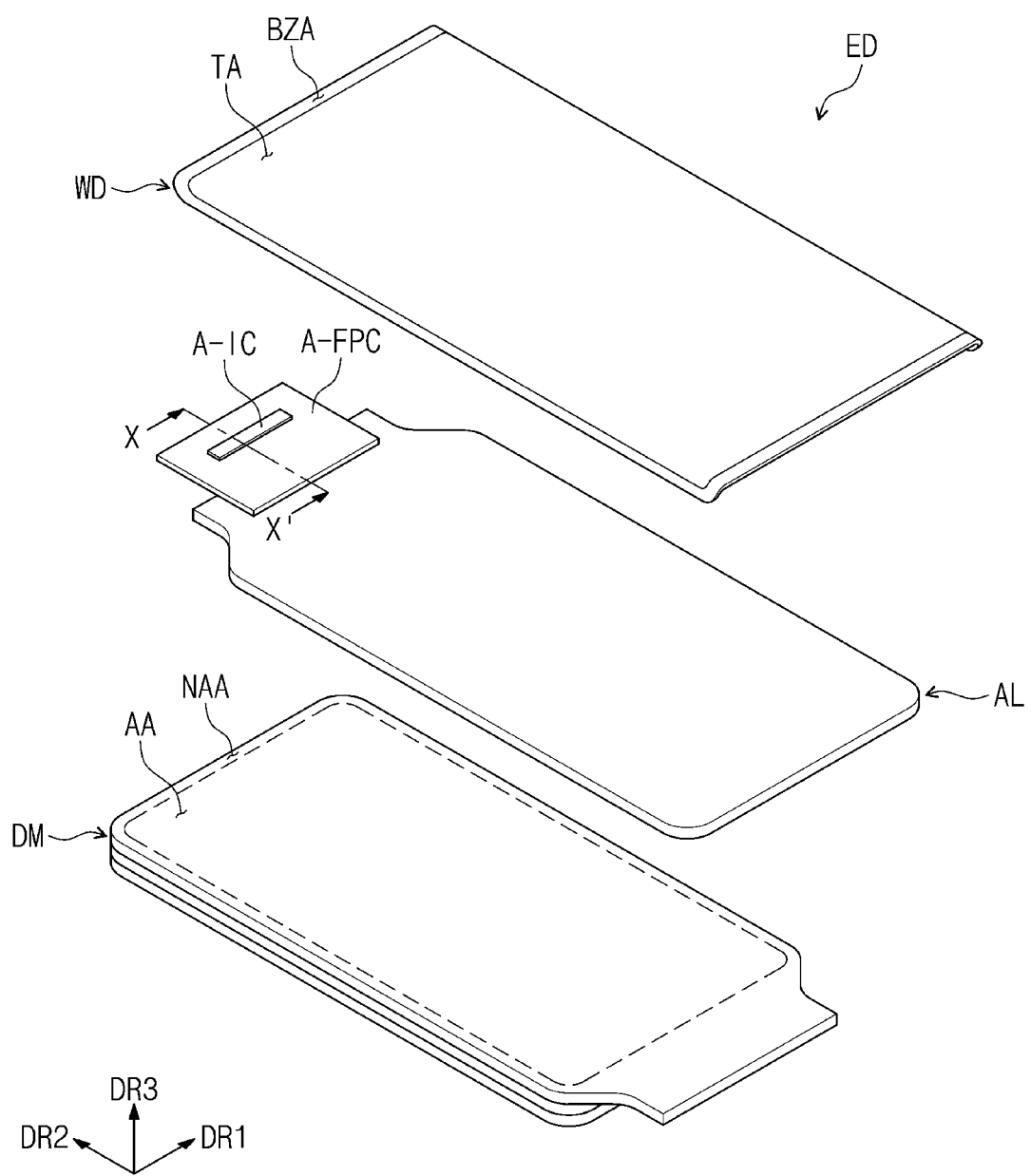
FIG. 2 is an exploded perspective view illustrating an electronic device according to an embodiment of the present disclosure.
Figure 3:
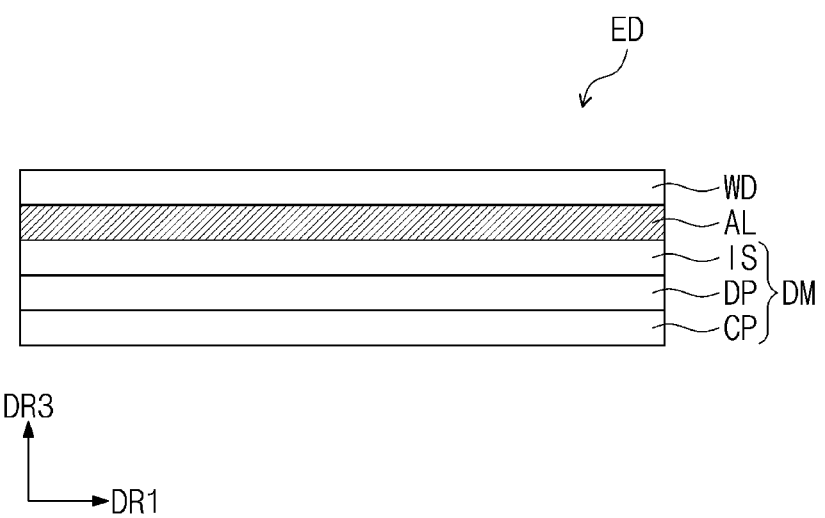
FIG. 3 is a cross-sectional view illustrating an electronic device according to an embodiment of the present disclosure.

FIG. 2 is an exploded perspective view illustrating the electronic device ED according to an embodiment of the present disclosure, and FIG. 3 is a cross-sectional view illustrating the electronic device ED according to an embodiment of the present disclosure.

Referring to FIGS. 2 and 3, the electronic device ED may include a window WD, an antenna layer AL, and a display module DM.

The window WD may include an optically transparent insulating material. For example, the window WD may include glass or plastic. The window WD may have a single-layer or multi-layer structure. For example, the window WD may include a plurality of plastic films attached to each other by an adhesive or may include a glass substrate and a plastic film attached to the glass substrate by an adhesive.

The window WD may be divided into a transmission area TA and a bezel area BZA in a plane. The transmission area TA may be an optically transparent area. The bezel area BZA may be an area having a light transmittance that is lower than that of the transmission area TA. The bezel area BZA may define a shape of the transmission area TA. The bezel area BZA may be disposed adjacent to the transmission area TA and may surround the transmission area TA on one or more sides (e.g., the bezel area BZA may at least partially surround the transmission area TA).

The bezel area BZA may have a predetermined color. The bezel area BZA may at least partially cover the peripheral area NAA of the display module DM to prevent the peripheral area NAA from being seen. However, this is merely an example, and the bezel area BZA may be omitted from the window WD.

According to an embodiment, the window WD may include a thin film glass. The thin film glass may have a thickness equal to or smaller than about 30 um.

The display module DM may include a display panel DP, an input sensor IS, and a protective layer CP.

The display panel DP may include a base layer and a display layer. The base layer may include a synthetic resin layer. The synthetic resin layer may include a heat-curable resin. The base layer may have a multi-layer structure. The base layer may include a glass substrate or an organic/inorganic composite substrate.

The display layer may be disposed on the base layer. The display layer may include a configuration that substantially generates the image. The display layer may be a light emitting type display layer. For example, the display layer may be, but is not necessarily limited to being, an organic light emitting display (OLED) layer, a quantum dot display layer, or a micro-LED display layer. Alternatively, the display layer may be a backlight unit or a transmittance control layer that controls a transmittance of a light provided thereto from the outside. For example, the display layer may include liquid crystal molecules. The display layer will be described in more detail with reference to FIG. 4.

The input sensor IS may be disposed on the display panel DP. The input sensor IS may sense an external input applied to the display module DM from the outside. The external input may be a user input such as a part of user's body, light, heat, the presence of a stylus pen, or pressure.

The input sensor IS may be formed on the display panel DP through successive processes. For example, the input sensor IS may be disposed directly on the display panel DP such that there are no intervening elements present between the input sensor IS and the display panel DP. For example, a separate adhesive member might not be disposed between the input sensor IS and the display panel DP.

The protective layer CP may be disposed under the display panel DP and may protect the display panel DP from external impact and interference. The protective layer CP may include a variety of functional layers. For example, the protective layer CP may include a heat dissipation layer, a support layer, a cushion layer, and a shielding layer that shields the display panel DP from a battery. The protective layer CP may include at least one metal layer.

The antenna layer AL may be disposed on the input sensor IS. The antenna layer AL may transmit, receive, or both transmit and receive a wireless communication signal, for example, a radio frequency signal. The antenna layer AL may be referred to as a radio frequency device. The antenna layer AL may include a plurality of antennas (or a plurality of radiating portions). The antennas may transmit, receive, or both transmit and receive the same frequency band as each other or may transmit, receive, or both transmit and receive different frequency bands from each other.

The antenna layer AL may be formed on the input sensor IS through successive processes. For example, the antenna layer AL may be disposed directly on the input sensor IS. Accordingly, a third component might not be placed between the antenna layer AL and the input sensor IS. According to the present disclosure, the display panel DP, the input sensor IS, and the antenna layer AL may be formed through successive processes, and the third component might not be placed between the display panel DP, the input sensor IS, and the antenna layer AL. Accordingly, the transmittance of the electronic device ED may be increased, and a slim electronic device ED may be implemented.

The antenna layer AL may be disposed in the display area AA (refer to FIG. 1). Although the electronic device ED becomes smaller or thinner or the peripheral area NAA (refer to FIG. 1) around the display area AA (refer to FIG. 1) may be decreased, a space for the antenna layer AL may be obtained since the size of the display area AA (refer to FIG. 1) is unlikely to be reduced.

Figure 4:
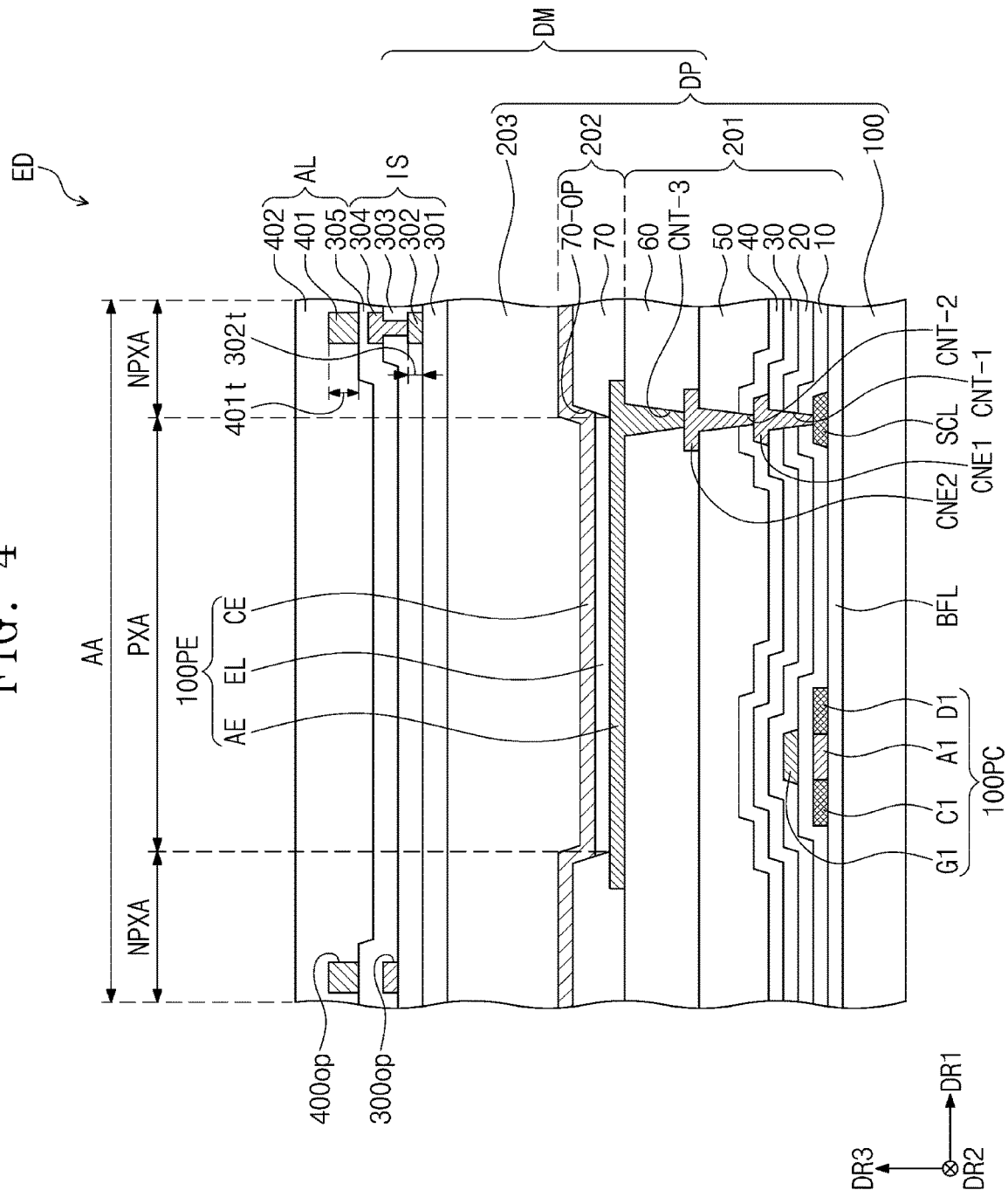
FIG. 4 is a cross-sectional view illustrating an electronic device according to an embodiment of the present disclosure.

FIG. 4 is a cross-sectional view illustrating the electronic device ED according to an embodiment of the present disclosure.

Referring to FIG. 4, the display panel PD may include a circuit layer 201, a light emitting element layer 202, and an encapsulation layer 203. The display panel DP may include a plurality of insulating layers, a semiconductor pattern, a conductive pattern, and a signal line. An insulating layer, a semiconductor layer, and a conductive layer may be formed by a coating or depositing process. Then, the insulating layer, the semiconductor layer, and the conductive layer may be selectively patterned through one or more photolithography processes. The semiconductor pattern, the conductive pattern, and the signal line included in the circuit layer 201 and the light emitting element layer 202 may be formed. Then, the encapsulation layer 203 at least partially covering the light emitting element layer 202 may be formed.

At least one inorganic layer may be formed on an upper surface of the base layer 100. The inorganic layer may include aluminum oxide, titanium oxide, silicon oxide, silicon oxynitride, zirconium oxide, and/or hafnium oxide. The inorganic layer may be formed in multiple layers. These multiple inorganic layers may form a barrier layer and/or a buffer layer. In an embodiment, the display panel DP may include a buffer layer BFL.

The buffer layer BFL may increase a coupling force between the base layer 100 and the semiconductor pattern. The buffer layer BFL may include a silicon oxide layer and a silicon nitride layer. The silicon oxide layer and the silicon nitride layer may be alternately stacked with each other.

The semiconductor pattern may be disposed on the buffer layer BFL. The semiconductor pattern may include polysilicon, however, the present invention need not be limited thereto or thereby. The semiconductor pattern may include amorphous silicon or metal oxide.

FIG. 4 shows only a portion of the semiconductor pattern, and the semiconductor pattern may be further disposed in other areas. The semiconductor pattern may be arranged over the pixels according to a desired arrangement. The semiconductor pattern may have different electrical properties depending on whether it is doped or not. The semiconductor pattern may include a doped region and a non-doped region. The doped region may be doped with an N-type dopant or a P-type dopant. A P-type transistor may include a doped region doped with the P-type dopant, and an N-type transistor may include a doped region doped with the N-type dopant.

The doped region may have a conductivity that is greater than that of the non-doped region and may substantially serve as an electrode or signal line. The non-doped region may substantially correspond to an active region (or a channel) of the transistor. For example, a portion of the semiconductor pattern may be the active region of the transistor, another portion of the semiconductor pattern may be a source or a drain of the transistor, and the other portion of the semiconductor pattern may be a connection electrode or a connection signal line.

Each of the pixels may have an equivalent circuit that includes seven transistors, one capacitor, and a light emitting element, and the equivalent circuit may be changed in various ways. FIG. 4 shows one transistor 100PC among the seven transistors included in the pixel and the light emitting element 100PE included in the pixel.

A source C1, an active region A1, and a drain D1 of the transistor 100PC may be formed from the semiconductor pattern. The source C1 and the drain DL1 may extend in opposite directions to each other from the active region A1 in a cross-section. FIG. 4 shows a portion of the connection signal line SCL formed from the semiconductor pattern. The connection signal line SCL may be connected to the transistor 100PC when viewed in a plane. Accordingly, the drain D1 of the transistor 100PC may be connected to a first electrode AE of the light emitting element 100PE via the connection signal line SCL.

A first insulating layer 10 may be disposed on the buffer layer BFL. The first insulating layer 10 may commonly overlap the pixels (e.g., the single first insulating layer 10 may overlap all of the pixels) and may at least partially cover the semiconductor pattern. The first insulating layer 10 may be an inorganic layer and/or an organic layer and may have a single-layer or multi-layer structure. The first insulating layer 10 may include aluminum oxide, titanium oxide, silicon oxide, silicon oxynitride, zirconium oxide, and/or hafnium oxide. In an embodiment, the first insulating layer 10 may have a single-layer structure of a silicon oxide layer. An insulating layer of the circuit layer 201, described below, may also be an inorganic layer and/or an organic layer and may have a single-layer or multi-layer structure. The inorganic layer may include at least one of the above-mentioned materials, however, the present invention need not be limited exclusively to this particular arrangement.

A gate G1 of the transistor 100PC may be disposed on the first insulating layer 10. The gate G1 may be a portion of a metal pattern. The gate G1 may at least partially overlap the active region A1. The gate G1 may be used as a mask in a process of doping the semiconductor pattern.

A second insulating layer 20 may be disposed on the first insulating layer 10 and may at least partially cover the gate G1. The second insulating layer 20 may commonly overlap the pixels. The second insulating layer 20 may be an inorganic layer and/or an organic layer and may have a single-layer or multi-layer structure. In an embodiment, the second insulating layer 20 may have a single-layer structure of a silicon oxide layer.

A third insulating layer 30 may be disposed on the second insulating layer 20. In an embodiment, the third insulating layer 30 may have a single-layer structure of a silicon oxide layer. A first connection electrode CNE1 may be disposed on the third insulating layer 30. The first connection electrode CNE1 may be connected to the connection signal line SCL through a contact hole CNT-1 defined through the first, second, and third insulating layers 10, 20, and 30.

A fourth insulating layer 40 may be disposed on the third insulating layer 30. The fourth insulating layer 40 may have a single-layer structure of a silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 through a contact hole CNT-2 defined through the fourth insulating layer 40 and the fifth insulating layer 50.

A sixth insulating layer 60 may be disposed on the fifth insulating layer 50 and may at least partially cover the second connection electrode CNE2. The sixth insulating layer 60 may be an organic layer.

The light emitting element layer 202 including the light emitting element 100PE may be disposed on the circuit layer 201. The light emitting element 100PE may include the first electrode AE, a light emitting layer EL, and the second electrode CE.

The first electrode AE may be disposed on the sixth insulating layer 60. The first electrode AE may be connected to the second connection electrode CNE2 through a contact hole CNT-3 defined through the sixth insulating layer 60.

A pixel definition layer 70 may be disposed on the sixth insulating layer 60 and may at least partially cover a portion of the first electrode AE. An opening 70-OP may be defined through the pixel definition layer 70. At least a portion of the first electrode AE may be exposed through the opening 70-OP of the pixel definition layer 70.

As shown in FIG. 4, the display panel DP may include a light emitting area PXA and a peripheral area NPXA proximate to the light emitting area PXA, which are defined in the display panel DP. In an embodiment, the light emitting area PXA may be defined to correspond to the portion of the first electrode AE exposed through the opening 70-OP. The light emitting area PXA may be provided in plural, and the peripheral area NPXA may at least partially surround the light emitting areas PXA. The light emitting area PXA and the peripheral area NPXA may be defined in the display area AA of the electronic device ED.

The light emitting layer EL may be disposed on the first electrode AE. The light emitting layer EL may be disposed in an area corresponding to the opening 70-OP. For example, the light emitting layer EL may be formed in each of the pixels after being divided into plural portions. When the light emitting layer EL is formed in each of the pixels after being divided into plural portions, each of the light emitting layers EL may emit a light having at least one of blue, red, and green colors, however, the present invention need not be limited exclusively to this particular arrangement. The light emitting layer EL may be connected to the pixels and the light emitting layer EL may be commonly provided (e.g., one singular light emitting layer EL may be connected to all of the pixels). In this case, the light emitting layer EL may provide a blue light or a white light.

The second electrode CE may be disposed on the light emitting layer EL. The second electrode CE may have an integral shape and may be commonly disposed over the pixels (e.g., one singular second electrode CE may be disposed over all of the pixels).

A hole control layer may be disposed between the first electrode AE and the light emitting layer EL. The hole control layer may be commonly disposed in the light emitting area PXA and the peripheral area NPXA (e.g., a single hole control layer may be disposed in both the light emitting area PXA and the peripheral area NPXA). The hole control layer may include a hole transport layer and may further include a hole injection layer. An electron control layer may be disposed between the light emitting layer EL and the second electrode CE. The electron control layer may include an electron transport layer and may further include an electron injection layer. The hole control layer and the electron control layer may be commonly formed in the plural pixels using an open mask (e.g., a single mask may be used to form both the hole control layer and the electron control layer for all of the pixels).

The encapsulation layer 203 may be disposed on the light emitting element layer 202. The encapsulation layer 203 may include an inorganic layer, an organic layer, and an inorganic layer, which are sequentially stacked, however, layers included in the encapsulation layer 203 need not be limited exclusively to this particular arrangement. The inorganic layers may protect the light emitting element layer 202 from moisture and oxygen, and the organic layer may protect the light emitting element layer 202 from a foreign substance such as dust particles. The inorganic layers may include a silicon nitride layer, a silicon oxynitride layer, a silicon oxide layer, a titanium oxide layer, or an aluminum oxide layer. The organic layer may include an acrylic-based organic layer, however, the present invention need not be limited exclusively to this particular arrangement.

The input sensor IS may include a base insulating layer 301, a first sensing conductive layer 302, a sensing insulating layer 303, and a second sensing conductive layer 304.

The base insulating layer 301 may be an inorganic layer that includes silicon nitride, silicon oxynitride, or silicon oxide. Alternatively, the base insulating layer 301 may be an organic layer that includes an epoxy resin, an acrylic resin, or an imide-based resin. The base insulating layer 301 may have a single-layer structure or a multi-layer structure of layers stacked in the third direction DR3.

Each of the first and second sensing conductive layers 302 and 304 may have a single-layer structure or a multi-layer structure of layers stacked in the third direction DR3.

The conductive layer having the single-layer structure may include a metal layer or a transparent conductive layer. The metal layer may include molybdenum, silver, titanium, copper, aluminum, or alloys thereof. The transparent conductive layer may include a transparent conductive oxide, such as indium tin oxide (ITO), indium zinc oxide (IZO), zinc oxide (ZnO), indium zinc tin oxide (ITZO), or the like. In addition, the transparent conductive layer may include conductive polymer such as PEDOT, metal nanowire, graphene, or the like.

The conductive layer having the multi-layer structure may include metal layers. The metal layers may have a three-layer structure of titanium/aluminum/titanium. The conductive layer having the multi-layer structure may include at least one metal layer and at least one transparent conductive layer.

The input sensor IS may obtain information on the external input on the basis of a variation in mutual capacitance or may obtain the information on the external input on the basis of a variation in self-capacitance. For example, the input sensor IS may include a plurality of sensing electrodes 310 and 320 (refer to FIG. 4). Each of the sensing electrodes 310 and 320 (refer to FIG. 4) may include patterns included in the first sensing conductive layer 302 and/or the second sensing conductive layer 304.

The sensing insulating layer 303 may include an inorganic layer. The inorganic layer may include aluminum oxide, titanium oxide, silicon oxide, silicon oxynitride, zirconium oxide, and/or hafnium oxide.

The sensing insulating layer 303 may include an organic layer. The organic layer may include an acrylic-based resin, a methacrylic-based resin, a polyisoprene, a vinyl-based resin, an epoxy-based resin, a urethane-based resin, a cellulose-based resin, a siloxane-based resin, a polyimide-based resin, a polyamide-based resin, and/or a perylene-based resin.

The antenna layer AL may include a cover insulating layer 305, an antenna conductive layer 401, and an antenna insulating layer 402.

The cover insulating layer 305 may include an inorganic layer. The inorganic layer may include aluminum oxide, titanium oxide, silicon oxide, silicon oxynitride, zirconium oxide, and/or hafnium oxide.

Alternatively, the cover insulating layer 305 may include an organic layer. The organic layer may include an acrylic-based resin, a methacrylic-based resin, a polyisoprene, a vinyl-based resin, an epoxy-based resin, a urethane-based resin, a cellulose-based resin, a siloxane-based resin, a polyimide-based resin, a polyamide-based resin, and/or a perylene-based resin.

The cover insulating layer 305 may include a dielectric substance having a specific dielectric constant.

The antenna conductive layer 401 may be disposed on the cover insulating layer 305. The antenna conductive layer 401 may have a single-layer structure or a multi-layer structure of layers stacked in the third direction DR3. The antenna conductive layer 401 may include substantially the same material as that of the first sensing conductive layer 302 or the second sensing conductive layer 304 described above.

Figure 6:
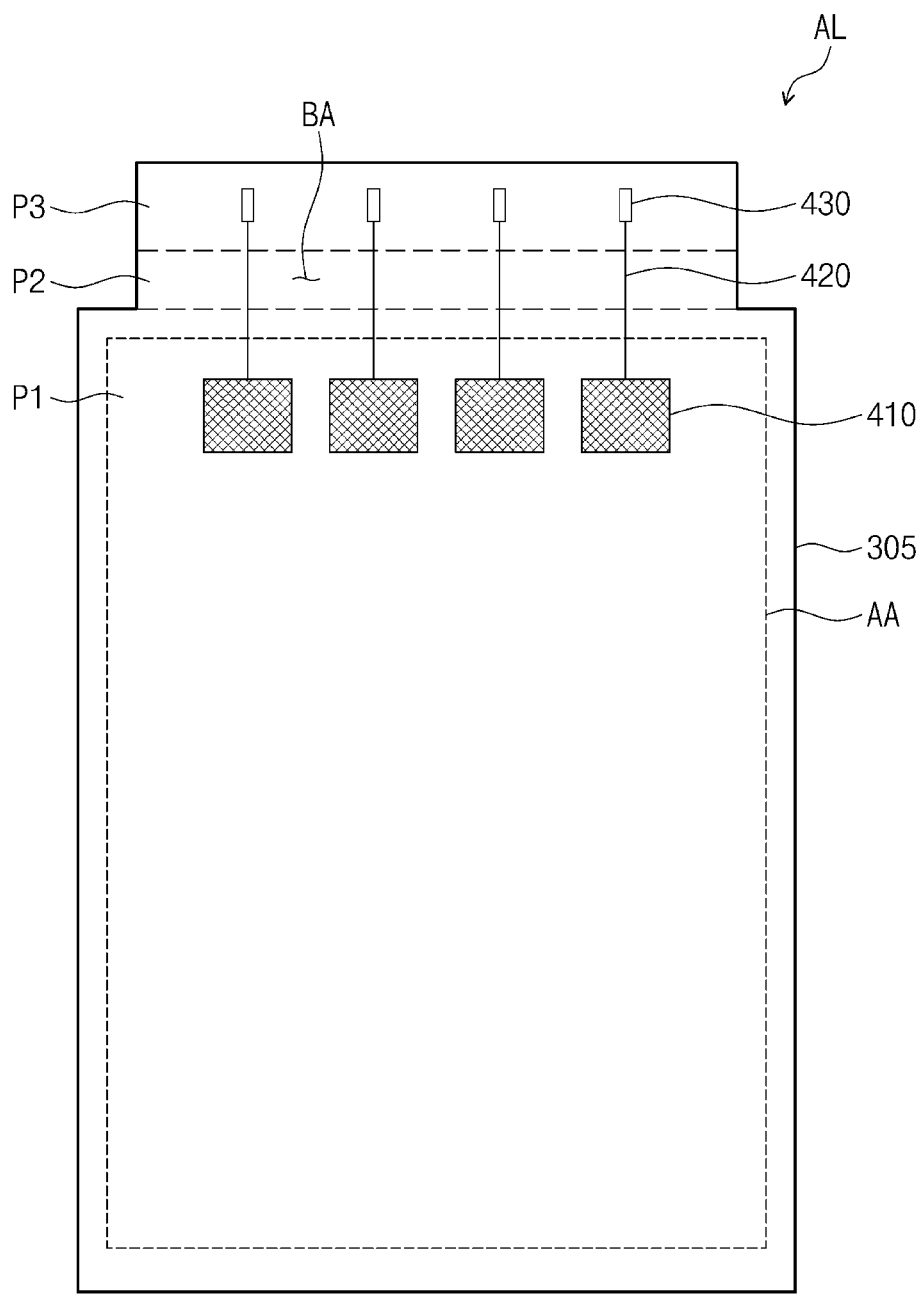
FIG. 6 is a plan view illustrating an antenna layer according to an embodiment of the present disclosure.

The antenna conductive layer 401 may include a plurality of antennas 410 (refer to FIG. 6). Accordingly, the antennas 410 (refer to FIG. 6) may be disposed directly on the cover insulating layer 305. A lower surface of the antennas 410 (refer to FIG. 6) may be in direct contact with an upper surface of the cover insulating layer 305 or an upper surface of the input sensor IS.

The antenna conductive layer 401 may have a thickness 401t greater than a thickness of each of the first sensing conductive layer 302 and the second sensing conductive layer 304. For example, the thickness 401t of the antenna conductive layer 401 may be equal to or greater than about 1.3 times a thickness 302t of the first sensing conductive layer 302 and may be equal to or smaller than about two times the thickness 302t of the first sensing conductive layer 302. For example, the thickness 302t of the first sensing conductive layer 302 may be within a range of about 2500 angstroms to about 3000 angstroms, and the thickness 401t of the antenna conductive layer 401 may be within a range of about 4000 angstroms to about 6000 angstroms. Accordingly, the antenna conductive layer 401 may have a resistance smaller than a resistance of the first sensing conductive layer 302 under the condition that an area of the antenna conductive layer 401 is the same as an area of the first sensing conductive layer 302 when viewed in a plane.

The antenna insulating layer 402 may at least partially cover the antenna conductive layer 401 and may provide a flat (e.g., planar) surface thereon. The antenna insulating layer 402 may include an organic layer. The organic layer may include an acrylic-based resin, a methacrylic-based resin, a polyisoprene, a vinyl-based resin, an epoxy-based resin, a urethane-based resin, a cellulose-based resin, a siloxane-based resin, a polyimide-based resin, a polyamide-based resin, and/or a perylene-based resin.

Openings 300op and 400op may be defined through the first sensing conductive layer 302, the second sensing conductive layer 304, and the antenna conductive layer 401. For example, the opening 300op provided in the second sensing conductive layer 304 may be an opening provided in the plural sensing electrodes 310 and 320 (refer to FIG. 5), and the opening 400op provided in the antenna conductive layer 401 may be an opening provided in the plural antennas 410 (refer to FIG. 6).

When viewed in the thickness direction of the display panel DP, e.g., the third direction DR3, the openings 300op and 400op may at least partially surround the light emitting area PXA. For example, when viewed in the thickness direction DR3 of the display panel DP, the conductive patterns included in each of the first sensing conductive layer 302, the second sensing conductive layer 304, and the antenna conductive layer 401 may at least partially overlap the peripheral area NPXA and may be spaced apart from the light emitting area PXA.

Figure 5:
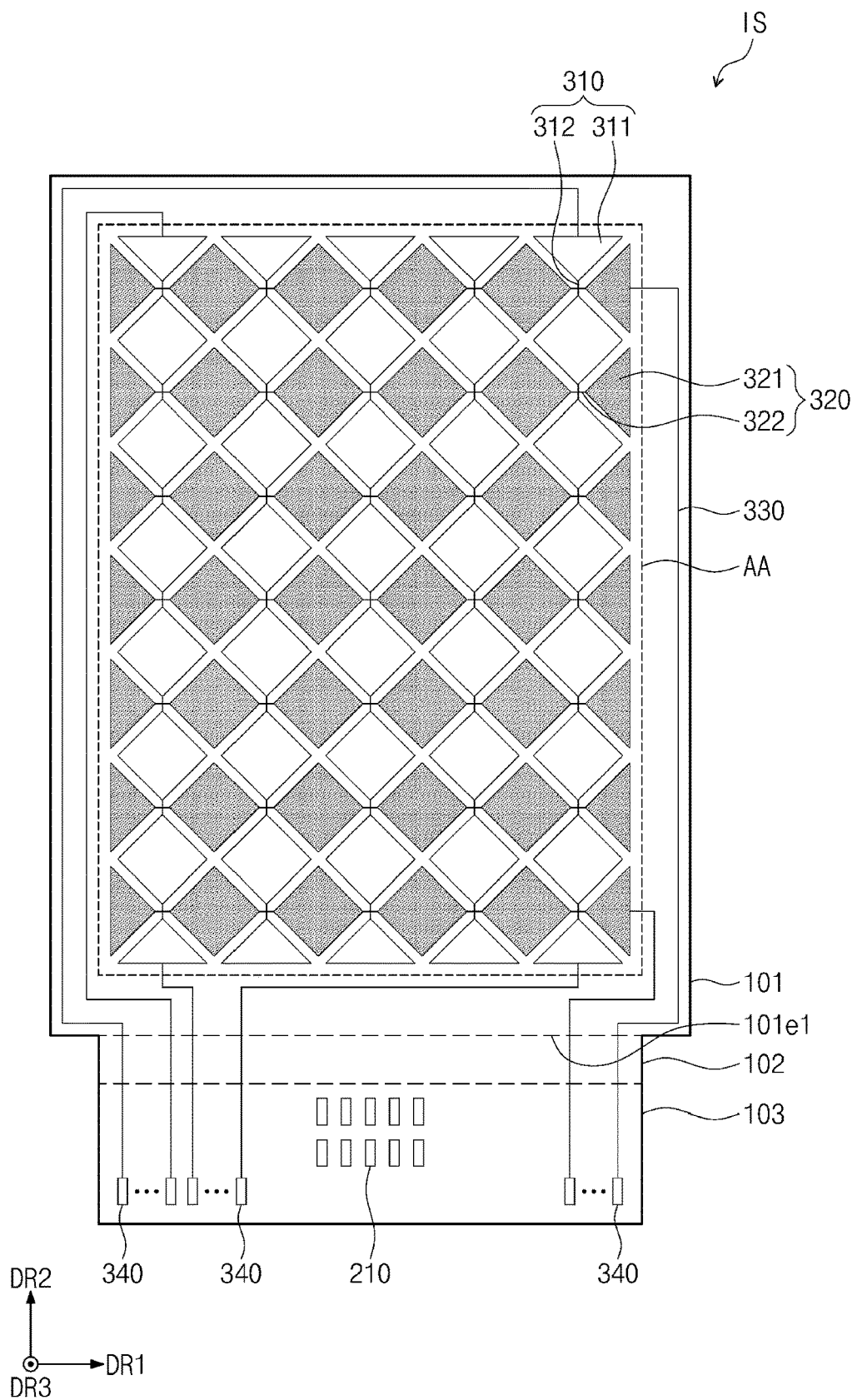
FIG. 5 is a plan view illustrating an input sensor according to an embodiment of the present disclosure.
Figure 7:
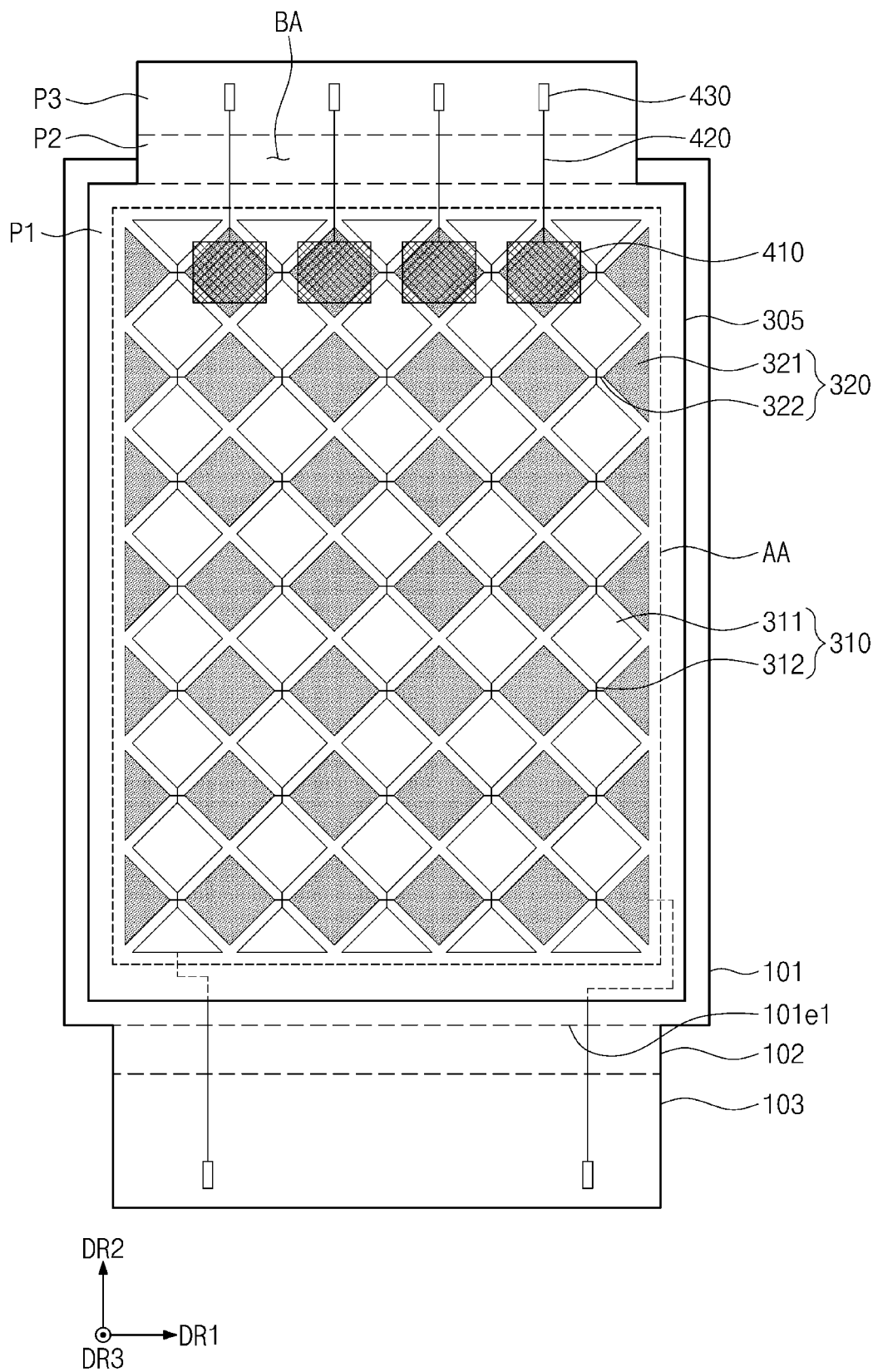
FIG. 7 is a plan view illustrating an input sensor and an antenna layer according to an embodiment of the present disclosure.

FIG. 5 is a plan view illustrating the input sensor IS according to an embodiment of the present disclosure. FIG. 6 is a plan view illustrating the antenna layer AL according to an embodiment of the present disclosure. FIG. 7 is a plan view illustrating the input sensor and the antenna layer according to an embodiment of the present disclosure.

Referring to FIGS. 4 and 5, the base layer 100 may include a first base area 101, a second base area 102, and a third base area 103, which are defined therein. The first base area 101 may at least partially overlap the light emitting area PXA and the peripheral area NPXA shown in FIG. 4. In addition, the first base area 101 may at least partially overlap the display area AA of the electronic device ED (refer to FIG. 1).

The second base area 102 may extend from a first edge portion 101e1 of the first base area 101. The third base area 103 may extend from the second base area 102.

The second base area 102 may be bent toward a rear surface of the first base area 101 when the electronic device ED (refer to FIG. 1) is assembled. Accordingly, the third base area 103 of the electronic device ED (refer to FIG. 1) may be disposed on the rear surface of the first base area 101. As used herein, the term "bent" is intended to mean that the element has a non-planar shape that is curved, regardless of whether that element was formed with the curve or was formed flat and then bent.

The input sensor IS may include a plurality of first sensing electrodes 310, a plurality of second sensing electrodes 320, a plurality of sensing lines 330, and a plurality of sensing pads 340.

The first sensing electrodes 310 and the second sensing electrodes 320 may be disposed in the display area AA. The input sensor IS may obtain the information on the external input based on a variation in mutual capacitance between the first sensing electrodes 310 and the second sensing electrodes 320.

The first sensing electrodes 310 may be arranged in the first direction DR1 and they may be spaced apart from each other. Each of the first sensing electrodes 310 may extend in the second direction DR2. The second sensing electrodes 320 may be arranged in the second direction DR2 and they may be spaced apart from each other. Each of the second sensing electrodes 320 may extend in the first direction DR1.

Each of the first sensing electrodes 310 may include a plurality of sensing patterns 311 and a bridge pattern 312 electrically connected to two sensing patterns 311 adjacent to each other among the sensing patterns 311.

The sensing patterns 311 and the bridge pattern 312 may be disposed on different layers from each other. For example, in a case where the bridge pattern 312 is included in the first sensing conductive layer 302, the sensing patterns 311 may be included in the second sensing conductive layer 304. Alternatively, in a case where the bridge pattern 312 is included in the second sensing conductive layer 304, the sensing patterns 311 may be included in the first sensing conductive layer 302.

Each of the second sensing electrodes 320 may include a plurality of first portions 321 and a second portion 322 defined between the first portions 321 adjacent to each other among the first portions 321. The first portions 321 may be referred to as sensing portions, and the second portion 322 may be referred to as a connection portion or a crossing portion.

The first portions 321 may be provided integrally with the second portion 322 (e.g., the first portions 321 and the second portions 322 may be one continuous structure with each other). Accordingly, the second portion 322 may be defined as a portion crossing the bridge pattern 312 in each of the second sensing electrodes 320. The first portions 321 and the second portion 322 may be disposed on the same layer, and in addition, the first portions 321 and the second portion 322 may be disposed on the same layer as the sensing patterns 311.

Each of the first sensing electrodes 310 and each of the second sensing electrodes 320 may be electrically connected to at least one of the sensing lines 330. For example, one first sensing electrode 310 may be connected to two sensing lines 330. One sensing line 330 of the two sensing lines 330 may be electrically connected to one end of the first sensing electrode 310, and the other sensing line 330 of the two sensing lines 330 may be electrically connected to the other end of the first sensing electrode 310. One second sensing electrode 320 may be electrically connected to one sensing line 330. However, a connection relation of the sensing lines 330 with respect to the first sensing electrodes 310 and the second sensing electrodes 320 need not be limited exclusively to this particular arrangement.

The sensing pads 340 may be electrically connected to the sensing lines 330, respectively. The sensing pads 340 may be disposed in the third base area 103. Driving chip pads 210 may be disposed in the third base area 103. A driving chip that is electrically connected to the display module DM may be disposed on the driving chip pads 210.

The antenna layer AL may include the antennas 410, a plurality of antenna lines 420, and a plurality of antenna pads 430. FIG. 6 shows four antennas 410 as a representative example, however, the number of the antennas 410 included in the electronic device ED (refer to FIG. 1) need not be limited to this particular arrangement.

The antenna layer AL may include a first portion P1, a second portion P2, and a third portion P3. The first, second, and third portions P1, P2, and P3 may include the cover insulating layer 305. The first portion P1 may at least partially overlap the display area AA, and the second portion P2 may at least partially overlap a bending area BA. The third portion P3 may extend from the second portion P2.

The antenna lines 420 may be electrically connected to the antennas 410, respectively. The antenna pads 430 may be electrically connected to the antenna lines 420, respectively. The antennas 410 may be disposed on the first portion P1, the antenna lines 420 may be disposed on the second portion P2, and the antenna pads 430 may be disposed on the third portion P3. The antennas 410 may have a mesh shape.

An antenna circuit layer A-FPC (refer to FIG. 2) may be further disposed on the third portion P3. An antenna driving chip A-1C (refer to FIG. 2) may be electrically connected to the antenna circuit layer A-FPC (refer to FIG. 2). In this case, pads that are electrically connected to a film on which the antenna driving chip A-IC (refer to FIG. 2) is mounted may be further provided.

In FIG. 7, each of the antennas 410 may be included in the antenna conductive layer 401. The antennas 410 may be disposed in the display area AA. Accordingly, each of the antennas 410 may at least partially overlap a portion of the first sensing electrodes 310 or a portion of the second sensing electrodes 320.

Figure 8:
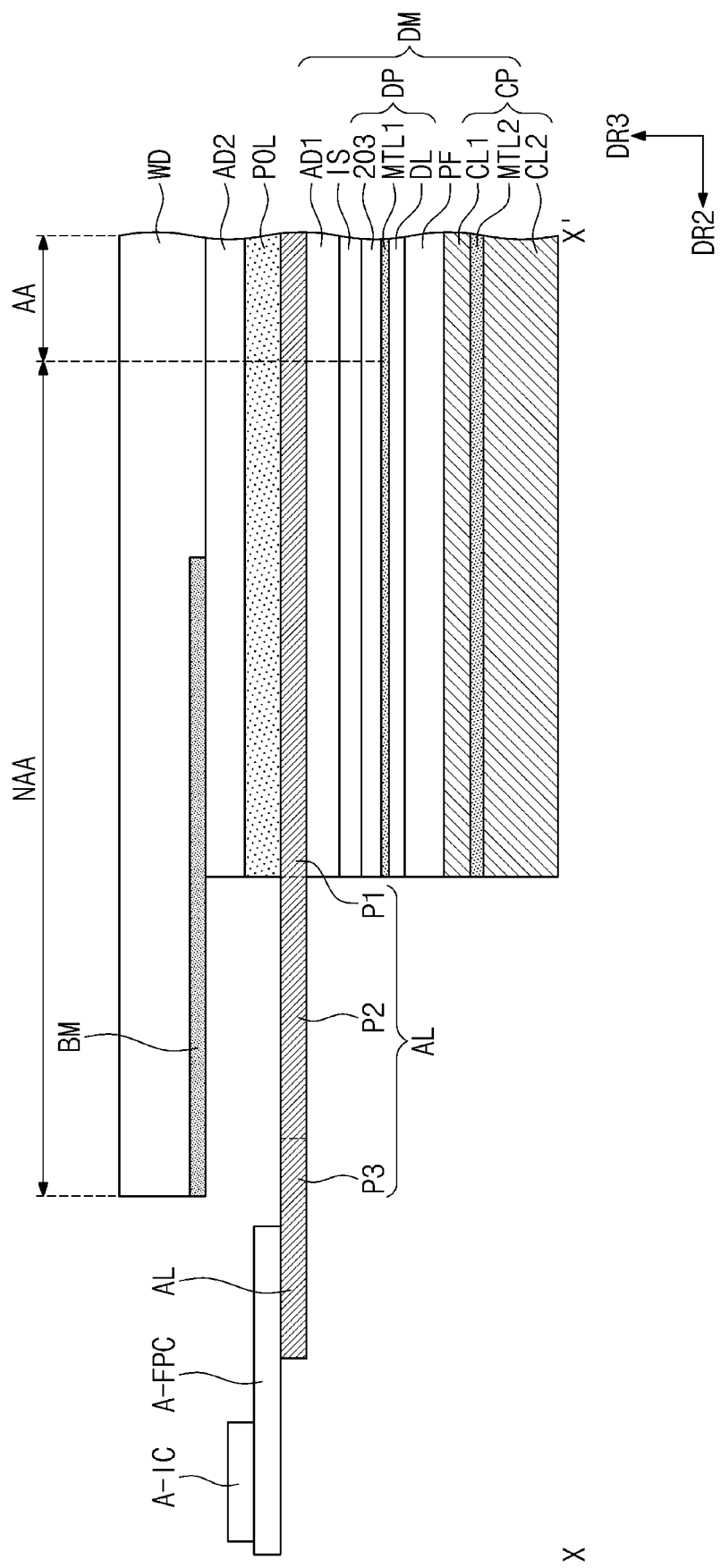
FIG. 8 is a cross-sectional view illustrating an electronic device according to an embodiment of the present disclosure.
Figure 9:
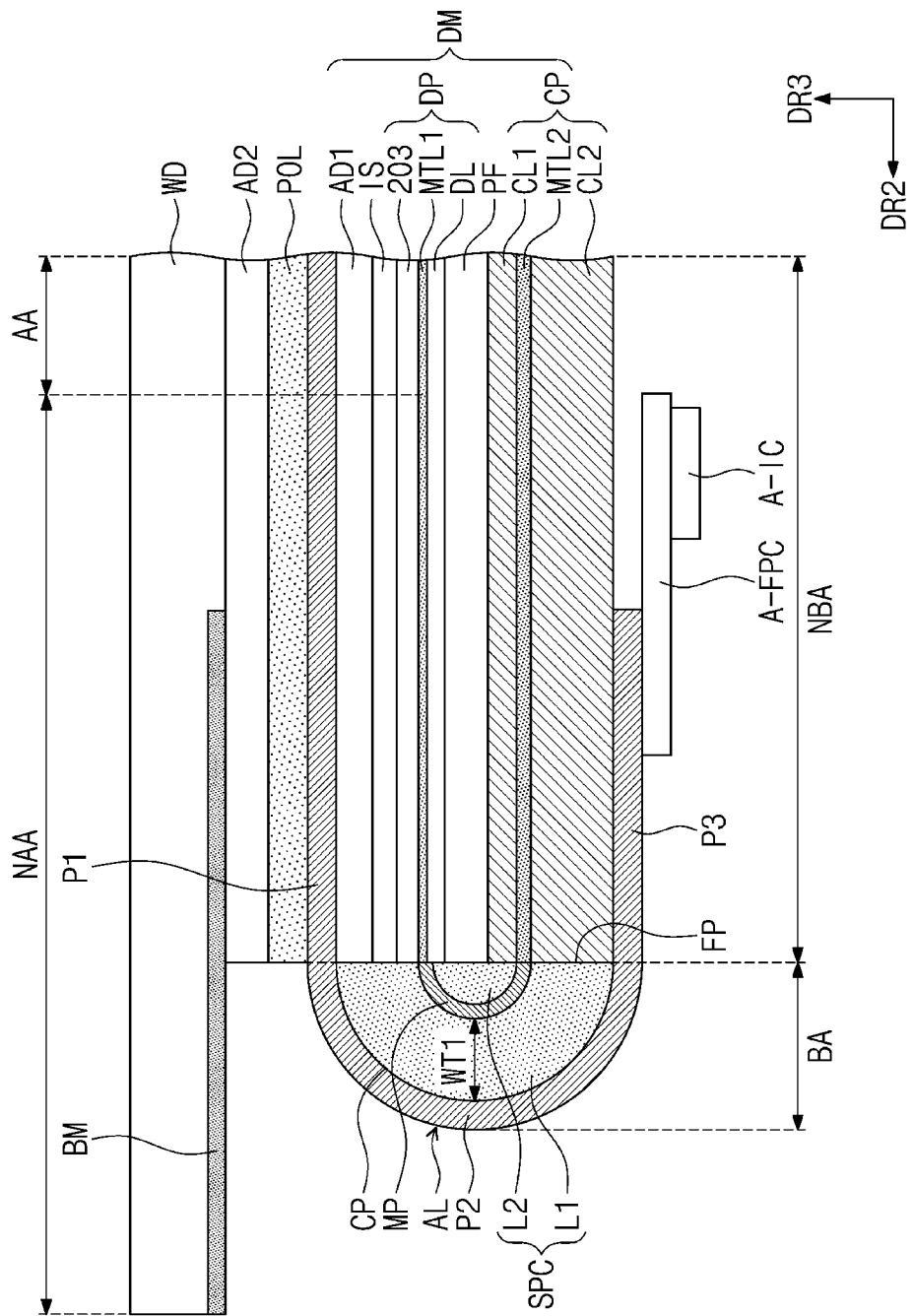
FIG. 9 is a cross-sectional view illustrating an electronic device according to an embodiment of the present disclosure.

FIG. 8 is a cross-sectional view illustrating the electronic device according to an embodiment of the present disclosure. FIG. 8 shows the cross-section taken along a line X-X' of FIG. 2. FIG. 9 is a cross-sectional view illustrating the electronic device according to an embodiment of the present disclosure.

FIG. 8 shows a state in which the second portion P2 of the antenna layer AL is not bent (e.g., the antenna layer AL has a planar shape), and FIG. 9 shows a state in which the second portion P2 of the antenna layer AL of FIG. 8 is bent (e.g., the antenna layer AL has a curved shape).

Referring to FIGS. 8 and 9, the electronic device ED (refer to FIG. 1) may include the window WD, the antenna layer AL, and the display module DM. The electronic device ED may include an anti-reflective layer POL disposed on the antenna layer AL.

The electronic device ED may include a first adhesive layer AD1 disposed between the input sensor IS and the antenna layer AL. The electronic device ED may include a second adhesive layer AD2 disposed between the window WD and the anti-reflective layer POL. According to an embodiment, the first and the second adhesive layers AD1 and AD2 may be omitted.

The input sensor IS may be disposed directly on the encapsulation layer 203. For example, there might be no other components disposed between the input sensor IS and the encapsulation layer 203.

In FIGS. 8 and 9, the bending area BA may be defined in the non-display area NAA. A light blocking pattern BM may be disposed in the non-display area NAA, and the bending area BA may at least partially overlap the light blocking pattern BM. In FIG. 8, in a case where the antenna layer AL is not bent, a length of the light blocking pattern BM of the non-display area NAA increases such that the antenna layer AL is hidden. In FIG. 9, the antenna layer AL may be bent in the bending area BA, and thus, the length of the light blocking pattern BM may decrease. For example, in the electronic device ED (refer to FIG. 1) according to an embodiment of the present disclosure, the bezel area in which the light blocking pattern BM corresponding to a dead space is included may decrease.

Referring to FIG. 9, the display module DM may be disposed in a non-bending area NBA. The non-bending area NBA may be defined adjacent to the bending area BA and may be defined in portions of the display area AA and the non-display area NAA.

The display module DM may include the display panel DP, the input sensor IS, the protective layer CP, and a pattern film PF.

The pattern film PF may be a thin film in which various patterns are formed.

The display panel DP may include the display layer DL, a first metal layer MTL1, and the encapsulation layer 203.

The first metal layer MTL1 may reflect a radiation signal incident into the display module DM. For example, the first metal layer MTL1 may serve as a lower ground of the antenna layer AL. According to an embodiment, the first metal layer MTL1 may correspond to a cathode electrode. For example, the second electrode CE may be the first metal layer MTL1 in FIG. 4, however, the present invention need not be limited exclusively to this particular arrangement. Components included in the display module and containing a metal material may correspond to the first metal layer MTL1.

The display layer DL may include the circuit layer 201 and the light emitting element layer 202 of FIG. 4.

The protective layer CP may include a first protective layer CL1, a second protective layer CL2, and a second metal layer MTL2. The second metal layer MTL2 may be disposed between the first protective layer CL1 and the second protective layer CL2. The second metal layer MTL2 may correspond to a support layer or a shielding layer to protect the display panel DP. The first and second metal layers MTL1 and MTL2 may include aluminum, copper, stainless steel (SUS), or the like, and the first and second metal layers MTL1 and MTL2 need not be particularly limited to the use of these metals. The second metal layer MTL2 may serve as a lower ground of the antenna layer AL. The display module DM used here may be at least similar to the display modules DM described elsewhere in this specification.

The antenna layer AL may include the first portion P1 disposed on one surface of the display module DM and the third portion P3 disposed on the other surface of the display module DM. The first portion P1 and the third portion P3 may be connected to each other by the second portion P2. The second portion P2 may be disposed in the bending area BA, and the first portion P1 and the third portion P3 may be disposed in the non-bending area NBA. The second portion P2 may connect the first portion P1 and the third portion P3, which are disposed on opposite surfaces to each other of the display module DM, while being bent.

There is substantially no empty space between the first portion P1 and an upper surface of the display module DM, and there is substantially no empty space between the third portion P3 and a lower surface of the display module DM. In an embodiment, the upper surface of the display module DM may be a surface facing the window WD, and the lower surface of the display module DM may be a surface opposite to the upper surface. A side surface FP may connect the upper surface and the lower surface. However, an empty space may exist between the second portion P2 and the display module DM. The empty space may be defined by an inner side surface CP of the second portion P2 and the side surface FP of the display module DM.

In an embodiment, the empty space may be at least partially filled with a spacer SPC. For example, the spacer SPC may be disposed between the second portion P2 and the display module DM. The spacer SPC may include a dielectric substance. The spacer SPC may have a dielectric constant variably determined by taking into account antenna characteristics. The spacer SPC may include a first layer L1, a second layer L2, and a metal plate MP. The first layer L1 may be disposed adjacent to the second portion P2, and the second layer L2 may be disposed adjacent to the display module. A curvature of a surface of the first layer L1 that is in contact with the second portion P2 may be substantially the same as a curvature of the second portion P2. As used herein, having the same curvature may mean that the two elements have equal radii of curvature. For example, a radius of curvature of the surface of the first layer L1 may equal a radius of curvature of the second portion P2.

The metal plate MP may be disposed between the first layer L1 and the second layer L2. The metal plate MP may include a metal material, such as aluminum, copper, etc., however, other metals may be used. The metal plate MP may be in a bent state. The metal plate MP may have a curvature that is substantially the same as a curvature of the second portion P2. The metal plate MP may prevent the signal radiated from the second portion P2 from traveling toward the inside of the display module DM. For example, the signal radiated from the antenna layer AL may be radiated to the outside of the electronic device ED by the metal plate MP as well as by the first and second metal layers MTL1 and MTL2 without being absorbed into the display module DM. Accordingly, the performance of the antenna may be increased.

The second portion P2 and the metal plate MP may be spaced apart from each other. A separation distance WT1 between the second portion P2 and the metal plate MP may be greater than or equal to about 50 um. The separation distance WT1 need not be limited to the specified range and may be determined by taking into account antenna characteristics, e.g., an impedance matching, of the antennas of the antenna layer AL. However, a distance between the metal plate MP that serves as the lower ground and the antenna may be required to be equal to or greater than a predetermined value, and the distance may be greater than or equal to about 50 um. The metal plate MP may have a thickness smaller than a thickness of the antenna layer AL.

The thickness of the antenna layer AL may be greater than a thickness of the display panel DP and/or the input sensor IS. The thickness of each of the antennas 410 (refer to FIG. 6) may be greater than the thickness of the display panel DP and/or the input sensor IS.

The electronic device ED may include the antenna circuit layer A-FPC. The antenna circuit layer A-FPC may be disposed on the third portion P3 of the antenna layer AL. The antenna driving chip A-IC may be disposed on the antenna circuit layer A-FPC.

Figure 10A:
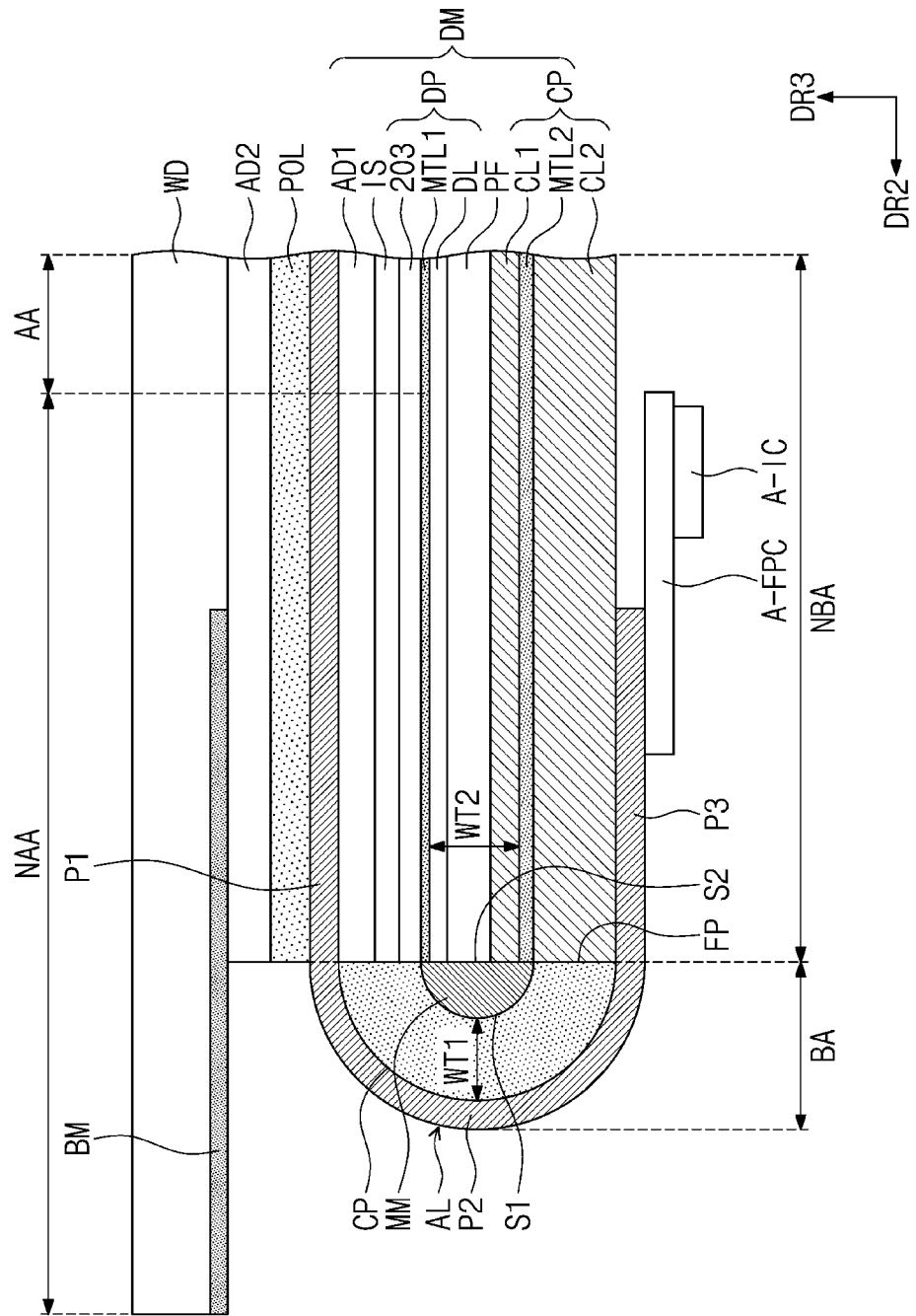
Figure 10B:
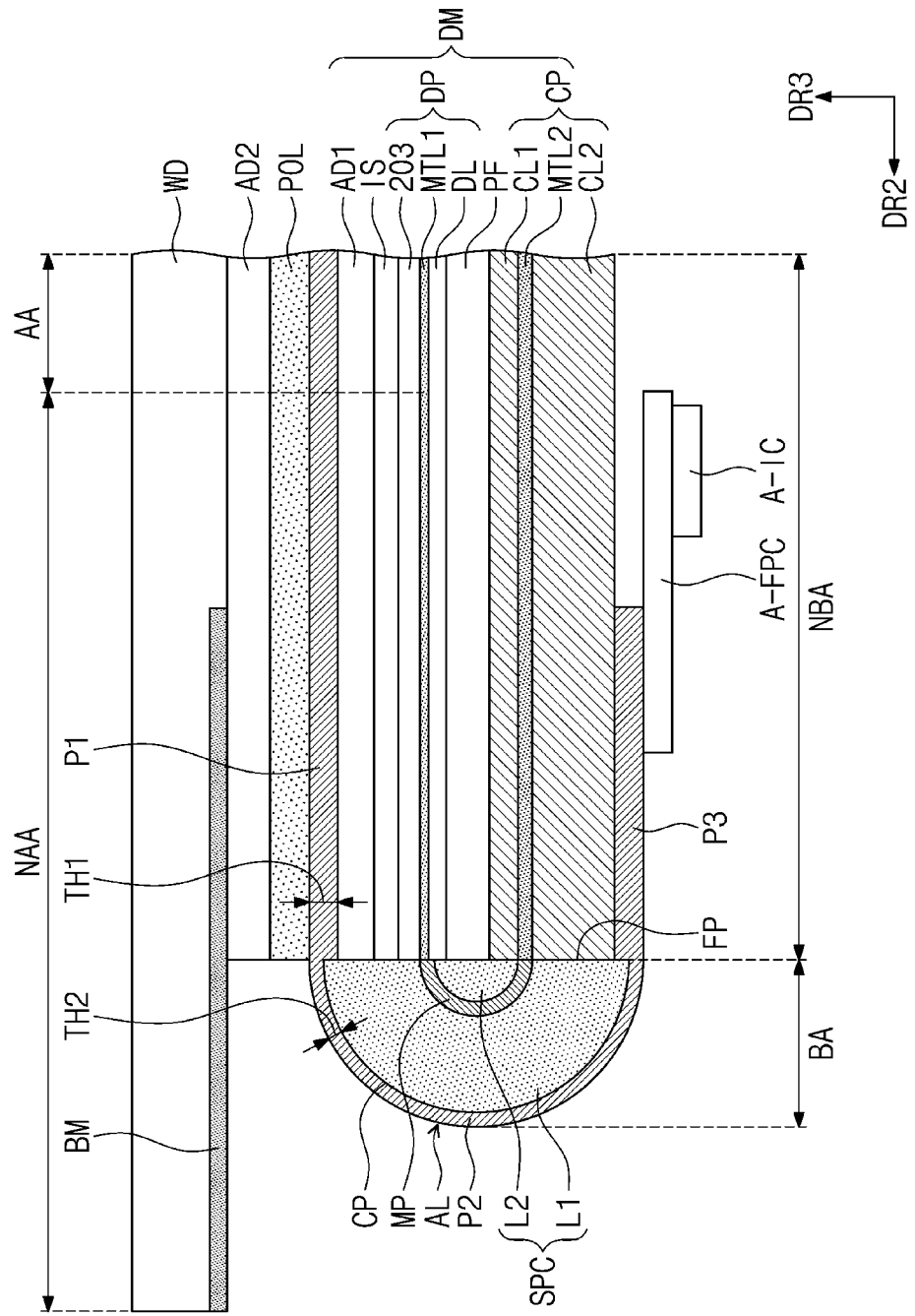

FIGS. 10A to 10C are cross-sectional views illustrating an electronic device according to an embodiment of the present disclosure.

Referring to FIG. 10A, a metal member MM may be disposed between a second portion P2 and a display module DM. The metal member MM may be in contact with a side surface of the display module DM. A spacer SPC may be disposed between the metal member MM and the second portion P2.

The metal member MM may include a first surface S1 adjacent to the spacer SPC and a second surface S2 making contact with a side surface FP of the display module DM. The first surface S1 may have a round shape. The first surface S1 may have a curvature that is substantially the same as a curvature of the second portion P2. The first surface S1 and the second portion P2 may be spaced apart from each other by a distance equal to or greater than about 50 um. For example, the spacer SPC may have a thickness equal to or greater than about 50 um.

In an embodiment, the metal member MM may have a semi-circular shape. The metal member MM may have a diameter that is substantially the same as a separation distance WT2 between the first metal layer MTL1 and the second metal layer MTL2. For example, a length of the second surface S2 of the metal member MM may be substantially the same as the separation distance WT2 between the first metal layer MTL1 and the second metal layer MTL2.

In FIG. 10B, a second portion P2 may have a thickness TH2 smaller than a thickness TH1 of a first portion P1 or a third portion P3. For example, the second portion P2 may have the thickness smaller than the thickness of the first portion P1 and the third portion P3 to be easily bent.

In FIG. 10C, a metal plate MP may extend from a second metal layer MTL2 of a protective layer CP. For example, the metal plate MP may be a portion of the second metal layer MTL2. The metal plate MP may be a portion at least partially overlapping a bending area BA of the second metal layer MTL2. First and second protective layers CL1 and CL2 may extend in the bending area BA. For example, the first and second protective layers CL1 and CL2 may be filled in an empty space between a second portion P2 of an antenna layer AL and a display module DM.

In an embodiment, the first and second protective layers CL1 and CL2 may include a dielectric substance having a specific dielectric constant. For example, the first and second protective layers CL1 and CL2 may include at least one insulating layer.

Figure 11:
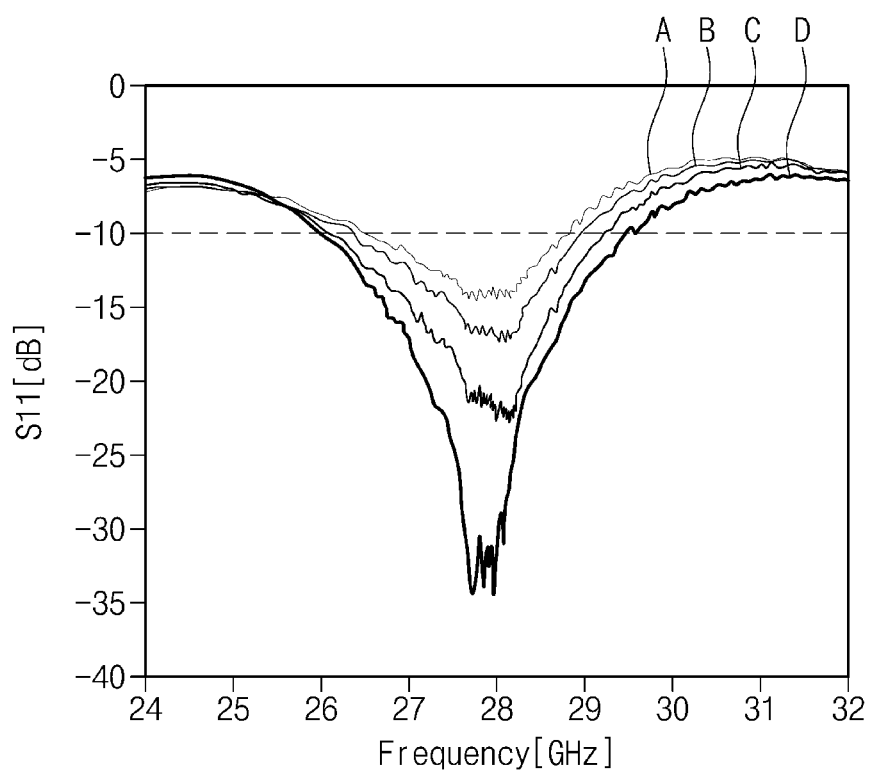
FIG. 11 is a graph illustrating an effect of an electronic device according to an embodiment of the present disclosure.

FIG. 11 is a graph illustrating an effect of an electronic device according to an embodiment of the present disclosure. The graph of FIG. 11 will be described with reference to Table 1.

TABLE 1

| | Frequency | Reflection coefficient (S11) | Bandwidth (BW) |
|---|---|---|---|
| Comparative example 1 (A) | 28 | −14.5 | 2.2 |
| Comparative example 2 (B) | 28 | −17.2 | 2.6 |
| Comparative example 3 (C) | 28 | −22.7 | 3.2 |
| Embodiment example 4 (D) | 28 | −34.3 | 3.5 |

Table 1 shows experimental examples to explain the effect of an embodiment of the present disclosure. "D" shows the effect of an embodiment of the present disclosure. In FIGS. 11, A, B, and C respectively show comparative examples. Comparative example 1(A), comparative example 2(B), and comparative example 3(C) show examples having different sizes in an empty space (refer to descriptions in FIG. 9) between a second portion of a bending area and a display module. The sizes of the empty space may satisfy: A>B>C. In the case of embodiment example D of the present disclosure, the empty space is in a state of being filled with the spacer and the metal plate. The frequency is set to about 28 GHz in all experimental examples equally.

Referring to Table 1 and FIG. 11, in comparative examples 1(A), 2(B), and 3(C) respectively corresponding to a case (A) where there is no metal plate serving as a lower ground and cases (B and C) where the metal plate is partially disposed, an absolute value of the reflection coefficient S11, which is an indicator of the performance of the antenna, is low. In the case of embodiment example (D), it is observed that the signals radiated into the display module through the empty space are blocked by the metal plate and the absolute value of the reflection coefficient S11 and the bandwidth BW are greater than those of comparative examples. For example, as the size of the empty space increases, the antenna efficiency becomes lower as can be seen in comparative examples 1, 2, and 3. In the case of embodiment example (D) in which the empty space is filled with the metal plate or other components, the efficiency of the antenna increases.

Although embodiments of the present disclosure have been described, it is understood that the present disclosure should not necessarily be limited to these embodiments but various changes and modifications can be made by one ordinary skilled in the art within the spirit and scope of the present disclosure.

What is claimed is:

1. An electronic device, comprising:

a display module comprising a display area and a non-display area;

an antenna layer disposed on the display module, the antenna layer comprising a bending area at least partially overlapping the non-display area and a non-bending area adjacent to the bending area, the antenna layer further comprising a first portion disposed in the non-bending area and a second portion disposed in the bending area, the second portion being bent; and a spacer disposed between the second portion and the display module and comprising a metal plate that is bent.

2. The electronic device of claim 1, wherein the spacer comprises:
a first layer adjacent to the second portion;
a second layer adjacent to the display module; and
a metal plate disposed between the first layer and the second layer.

3. The electronic device of claim 2, wherein a radius of curvature of a contact surface of the first layer making contact with the second portion is substantially the same as a radius of curvature of the second portion.

4. The electronic device of claim 2, wherein the metal plate has a radius of curvature that is substantially the same as a radius of curvature of the second portion.

5. The electronic device of claim 1, wherein the display module comprises a display panel and an input sensor disposed on the display panel, and the antenna layer is disposed on the input sensor.

6. The electronic device of claim 5, wherein the display panel comprises an encapsulation layer, and the input sensor is disposed directly on the encapsulation layer.

7. The electronic device of claim 5, wherein the display module further comprises a protective layer disposed under the display panel, the protective layer comprising at least one metal layer.

8. The electronic device of claim 7, wherein the metal plate extends from the at least one metal layer.

9. The electronic device of claim 1, wherein the antenna layer further comprises:
a plurality of antennas;
a plurality of antenna lines electrically connected to the plurality of antennas, respectively; and
a plurality of antenna pads electrically connected to the plurality of antenna lines, respectively.

10. The electronic device of claim 5, wherein the antenna layer has a thickness that is greater than a thickness of the input sensor.

11. The electronic device of claim 9, wherein the plurality of antennas have a mesh shape.

12. The electronic device of claim 9, wherein the antenna layer further comprises a third portion, the third portion is disposed on a surface of the display module opposite to a surface on which the first portion is disposed, and the second portion connects the first portion to the third portion.

13. The electronic device of claim 12, wherein the plurality of antennas are disposed on the first portion, the plurality of antenna lines are disposed on the second portion, and the plurality of antenna pads are disposed on the third portion.

14. The electronic device of claim 13, further comprising an antenna circuit layer disposed on the third portion and electrically connected to the plurality of antenna pads.

15. The electronic device of claim 1, wherein the display module further comprises at least one metal layer.

16. The electronic device of claim 1, wherein the second portion of the antenna layer has a thickness that is smaller than a thickness of the first portion.

17. An electronic device, comprising:
a display module comprising a display area and a non-display area;
an antenna layer disposed on the display module, the antenna layer comprising a bending area at least partially overlapping the non-display area and a non-bending area adjacent to the bending area, the antenna layer further comprising a first portion disposed in the non-bending area and a second portion disposed in the bending area, the second portion being bent;
a metal member disposed between the second portion and the display module; and
a spacer disposed between the metal member and the second portion.

18. The electronic device of claim 17, wherein the metal member comprises a first surface adjacent to the spacer and a second surface adjacent to the display module, the first surface having a round shape, and the first surface having a radius of curvature that is substantially the same as a radius of curvature of the second portion.

19. The electronic device of claim 17, wherein the display module comprises a plurality of metal layers spaced apart from each other.

20. The electronic device of claim 19, wherein the metal member has a semi-circular shape in a cross-section, and a diameter of the semi-circular shape is substantially the same as a separation distance between neighboring metal layers of the plurality of metal layers.

21. An electronic device, comprising:
a display module including a display area and a non-display area;
a window;
an antenna layer disposed between the display module and the window and at least partially overlapping both the display area and the non-display area of the display module; and
a spacer separating a bent portion of the antenna layer from the display module,
wherein the bent portion of the antenna layer is bent around the non-display area of the display module such that a portion of the non-display area of the display module is disposed between the antenna layer on two opposite sides thereof.

22. The electronic device of claim 21, wherein the antenna layer includes an antenna disposed between the display module and the window and overlapping the display area of the display module.

23. The electronic device of claim 21, further comprising an input sensor layer disposed between the display area of the display module and the antenna layer.

24. The electronic device of claim 21, further comprising a display driver mounted on a portion of the antenna layer that is bent around the display module.

* * * * *